United States Patent

Hirao

(10) Patent No.: US 10,439,462 B2
(45) Date of Patent: Oct. 8, 2019

(54) ROTARY ELECTRIC MACHINE

(71) Applicant: TOYOTA JIDOSHA KABUSHIKI KAISHA, Toyota-shi, Aichi-ken (JP)

(72) Inventor: Yasuyuki Hirao, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 5 days.

(21) Appl. No.: 15/811,003

(22) Filed: Nov. 13, 2017

(65) Prior Publication Data

US 2018/0166939 A1 Jun. 14, 2018

(30) Foreign Application Priority Data

Dec. 14, 2016 (JP) .................. 2016-242399

(51) Int. Cl.
- *H02K 3/32* (2006.01)
- *H02K 3/30* (2006.01)
- *H02K 3/04* (2006.01)
- *H02K 15/06* (2006.01)
- *H02K 15/04* (2006.01)

(52) U.S. Cl.
CPC ............... *H02K 3/32* (2013.01); *H02K 3/04* (2013.01); *H02K 3/30* (2013.01); *H02K 15/0414* (2013.01); *H02K 15/06* (2013.01)

(58) Field of Classification Search
CPC ......... H02K 3/04; H02K 3/32; H02K 15/0414
USPC ........................................... 310/185
See application file for complete search history.

(56) References Cited

U.S. PATENT DOCUMENTS

| 6,181,043 B1 * | 1/2001 | Kusase ............... H02K 3/12 310/180 |
| 2002/0079771 A1 | 6/2002 | Taji et al. |
| 2003/0160531 A1 | 8/2003 | Kato |
| 2014/0338183 A1 | 11/2014 | Nishiyama et al. |

FOREIGN PATENT DOCUMENTS

| CN | 201994750 U | 9/2011 |
| JP | 2001231203 A | 8/2001 |
| JP | 2003259583 A | 9/2003 |
| JP | 2014-007795 A | 1/2014 |
| JP | 2014-230295 A | 12/2014 |

* cited by examiner

Primary Examiner — Terrance L Kenerly
(74) Attorney, Agent, or Firm — Sughrue Mion, PLLC

(57) ABSTRACT

A stator coil includes a plurality of flat wire-shaped coil pieces extending in a circumferential direction of a rotary electric machine at a position on an outer side of a stator core in an axial direction of the rotary electric machine. At the position on the outer side of the stator core in the axial direction, a distal end portion of one of the coil pieces, extending in a first direction in the circumferential direction, is joined with a distal end portion of another one of the coil pieces, extending in a second direction in the circumferential direction. The second direction in the circumferential direction is reverse to the first direction in the circumferential direction. An axially outer end face of the distal end portion of each coil piece is a circular arc face that is convex toward the outer side in the axial direction.

5 Claims, 9 Drawing Sheets

ROTARY ELECTRIC MACHINE

INCORPORATION BY REFERENCE

The disclosure of Japanese Patent Application No. 2016-242399 filed on Dec. 14, 2016 including the specification, drawings and abstract is incorporated herein by reference in its entirety.

BACKGROUND

1. Technical Field

The disclosure relates to a rotary electric machine including a stator coil formed by joining a plurality of coil pieces.

2. Description of Related Art

Conventionally, there is widely known a stator coil formed by joining a plurality of coil pieces (see, for example, Japanese Patent Application Publication No. 2014-007795 (JP 2014-007795 A)). Each coil piece extends in the circumferential direction on the outer side of a stator core in the axial direction of the stator core. The distal ends of each coil piece are joined with the distal ends of other coil pieces by welding, or the like.

In the existing art, as shown in FIG. 11, each coil piece 32 extends in the circumferential direction, bends toward the outer side in the axial direction, and extends straight in the outward direction parallel to the axial direction. In this case, the coil end height is higher by a distance h1 by which each coil piece 32 extends toward the outer side in the axial direction. In the case of a rotary electric machine for which installation space is limited, such as a rotary electric machine that is mounted on an electric vehicle as a drive motor, such an increase in coil end height and, by extension, an increase in the size of the rotary electric machine, are major problems.

SUMMARY

Therefore, there has been partly suggested that, as shown in FIG. 12, the distal ends of each coil piece 32 are joined while remaining extended in the circumferential direction without being extended toward the outer side in the axial direction. With this configuration, it is possible to lower the coil end height, so it is possible to reduce the size of a rotary electric machine.

However, if axially outer end faces 42 of distal end portions 40 of each coil piece 32 are flat faces as shown in FIG. 12, it is difficult to align the heights of the distal end portions 40 of the plurality of coil pieces 32 in the axial direction. That is, ordinarily, a plurality of the coil pieces 32 are arranged in the radial direction. A distance between slots increases toward the outer side in the radial direction. Therefore, if the heights of the distal end portions 40 of the coil pieces 32 are intended to be aligned, a bending angle α of the coil piece 32 located on the outer side in the radial direction becomes smaller. As the bending angle α of each coil piece 32 varies, part of each distal end portion 40 extends off from the other joint to be joined, as shown in FIG. 13. In order to avoid such a protrusion, it is required to change the shape of each of the distal end portions 40 of each coil piece 32 in response to the bending angle α. However, preparing coil pieces 32 of multiple types with the distal end portions 40 having different shapes leads to an increase in time and effort for manufacturing and an increase in cost for manufacturing.

The disclosure provides a rotary electric machine that is simply manufactured while its size is further reduced.

An aspect of the disclosure provides a rotary electric machine. The rotary electric machine includes a rotor and a stator. The stator includes a stator core and a stator coil. The stator core is arranged concentrically with the rotor. The stator coil is wound on the stator core. The stator coil includes a plurality of flat wire-shaped coil pieces extending in a circumferential direction of the rotary electric machine at a position on an outer side of the stator core in an axial direction of the rotary electric machine. At the position on the outer side of the stator core in the axial direction, a distal end portion of one of the coil pieces, extending in a first direction in the circumferential direction, is joined with a distal end portion of another one of the coil pieces, extending in a second direction in the circumferential direction. The second direction in the circumferential direction is reverse to the first direction in the circumferential direction. An axially outer end face of the distal end portion of each coil piece is a circular arc face that is convex toward the outer side in the axial direction.

With the above configuration, each coil piece is joined in a state where the coil piece remains extended in the circumferential direction, so the coil end height is lowered, with the result that the size of the rotary electric machine is reduced. In addition, since the axially outer end face of each coil piece is a circular arc face, even when the positions (slant angles at the position on the outer side in the axial direction) of the two coil pieces to be joined vary, the distal end portions of the two coil pieces are appropriately put on top of each other. As a result, it is not required to prepare many types of coil pieces having different shapes of distal end portions, so the rotary electric machine is simply manufactured.

The coil pieces joined with each other may be put on top of each other in a thickness direction of the coil pieces and joined with each other such that central axes of the circular arc faces of the coil pieces coincide with each other.

With this configuration, the distal end portions of the coil pieces to be joined with each other are further appropriately put on top of each other.

A radius of the circular arc face of each coil piece may be larger than a width of the coil piece.

With this configuration, a distance at a lap portion (lap distance) at which the two coil pieces to be joined lap each other is increased, so a sufficient joint area is ensured.

Each coil piece may have a leg portion and a linking portion. The leg portion may extend in the axial direction inside a slot formed in the stator core. The linking portion may extend in the circumferential direction at the position on the outer side of the stator core in the axial direction. The stator coil may include two or more of the coil pieces arranged in a radial direction of the rotary electric machine. Among the two or more coil pieces, the coil piece arranged on an outer side in the radial direction may have a smaller bending angle such that a height of the distal end portion in the axial direction is the same, the bending angle is an angle that the leg portion forms with the linking portion.

With this configuration, the heights of the distal end portions of the coil pieces arranged in the radial direction are aligned to a lower height, with the result that the coil end height and, by extension, the size of the rotary electric machine, are further reduced.

All the distal end portions of the plurality of coil pieces may have the same shape.

With this configuration, the number of the types of the shape of the distal end portion of each coil piece is allowed to be one, so it is possible to further reduce time and effort for manufacturing and cost for manufacturing.

An entire part of each coil piece except the distal end portion may be coated with an insulation film, and a thickness of the insulation film may be larger than or equal to an insulation distance that is required between a coil piece not coated with the insulation film and a coil piece coated with the insulation film.

With this configuration, even when arrangement of the distal end portion and a portion at which the insulation film is applied is not considered, insulation between the distal end portion and the portion at which the insulation film is applied is ensured.

With the rotary electric machine according to the aspect of the disclosure, each coil piece is joined in a state where the coil piece remains extended in the circumferential direction, so the coil end height is lowered, with the result that the size of the rotary electric machine is reduced. In addition, since the axially outer end face of each coil piece is a circular arc face, even when the positions (slant angles at the position on the outer side in the axial direction) of the two coil pieces to be joined with each other varies, the distal end portions of the two coil pieces are appropriately put on top of each other. As a result, it is not required to prepare many types of coil pieces having different shapes of distal end portions, so the rotary electric machine is simply manufactured.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
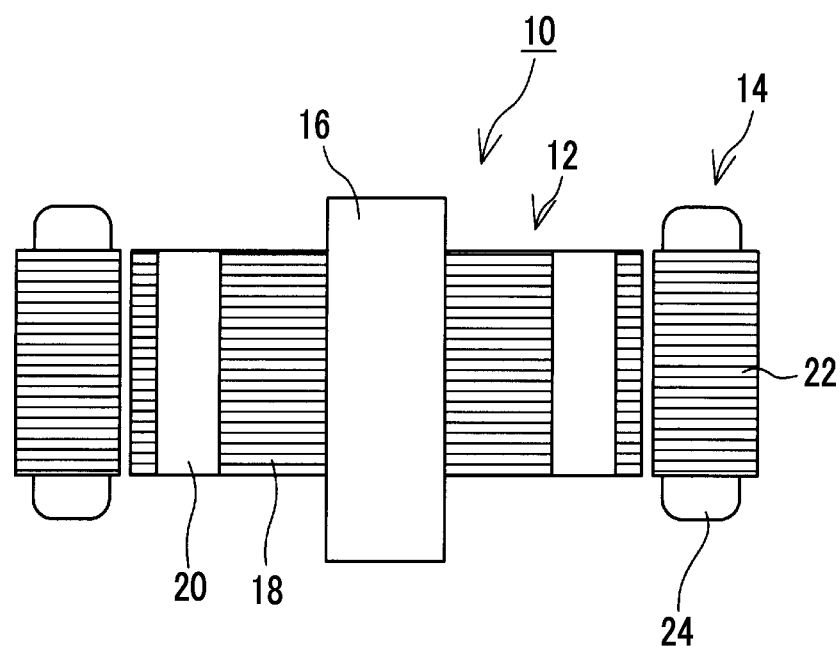
FIG. 1 is a view that shows the configuration of a rotary electric machine.
Figure 2:
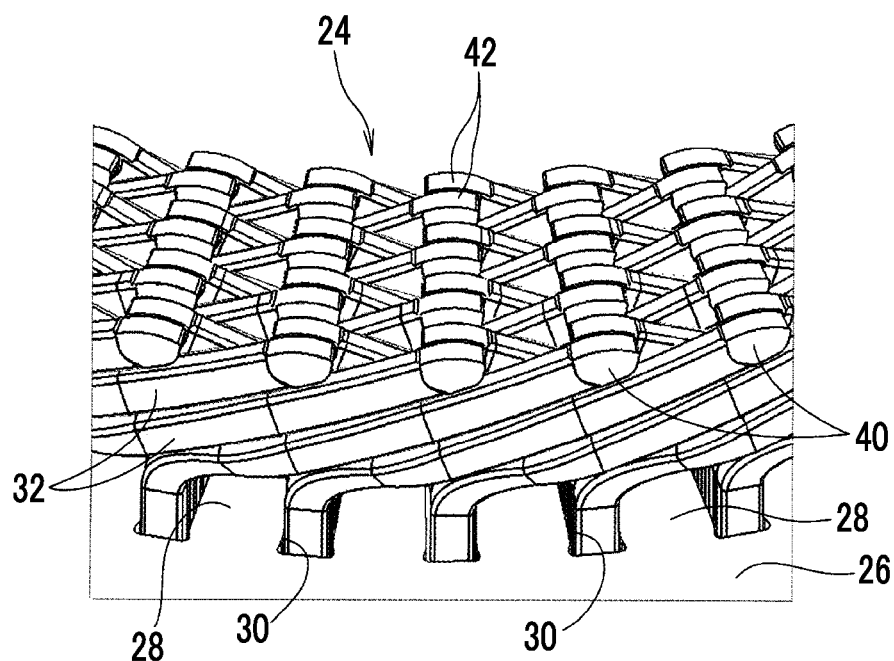
FIG. 2 is a perspective view around a coil end of a stator.
Figure 3:
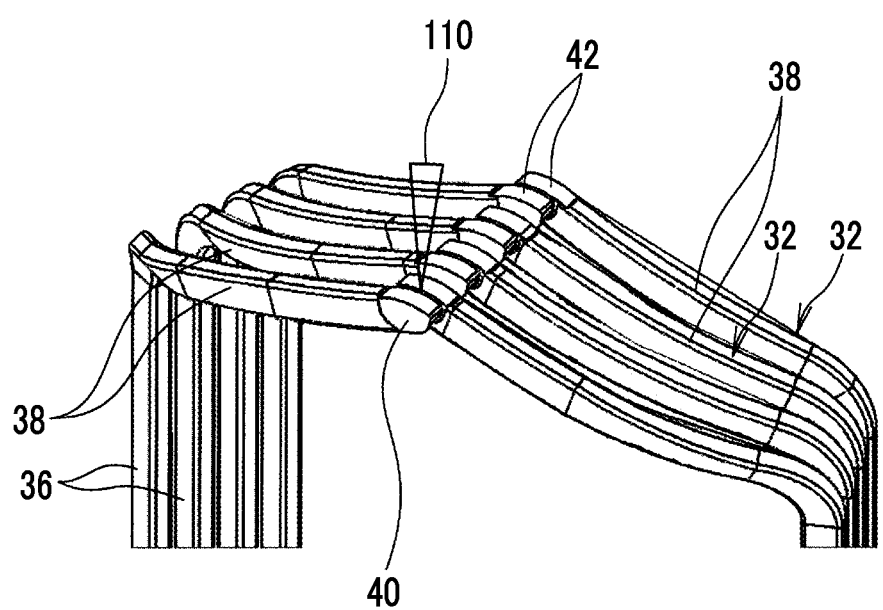
FIG. 3 is an extracted view of only coil pieces that belong to the same phase.

Hereinafter, the configuration of a rotary electric machine 10 according to an embodiment of the disclosure will be described with reference to the accompanying drawings. In the following description, "axial direction", "circumferential direction" and "radial direction" respectively mean the axial direction, circumferential direction and radial direction of the rotary electric machine 10. FIG. 1 is a schematic view that shows the configuration of the rotary electric machine 10. FIG. 2 is a perspective view around a coil end of a stator 14. FIG. 3 is an extracted view of only coil pieces 32 that belong to the same phase.

The rotary electric machine 10 includes a rotor 12, the stator 14 and a rotary shaft 16. The rotor 12 includes a rotor core 18 and one or more permanent magnets 20. The one or more permanent magnets 20 are provided inside the rotor core 18. The rotor core 18 is a cylindrical member formed of a plurality of electromagnetic steel sheets (for example, silicon steel sheets) stacked in the axial direction. The plurality of permanent magnets 20 are arranged at an interval in the circumferential direction, and constitute the magnetic poles of the rotor 12. The rotary shaft 16 is inserted through the center of the rotor core 18, and is fixedly connected to the rotor core 18. The rotary shaft 16 rotates on its axis together with the rotor 12.

The stator 14 includes a stator core 22 and a stator coil 24. The stator core 22 is arranged concentrically with the rotor 12 on the outer side of the rotor 12. The stator core 22 is formed of a plurality of electromagnetic steel sheets (for example, silicon steel sheets) stacked in the axial direction. The stator core 22 is broadly divided into a substantially cylindrical yoke 26 and a plurality of teeth 28. The plurality of teeth 28 protrude radially inward from the inner periphery of the yoke 26. The plurality of teeth 28 are arranged at equal intervals in the circumferential direction. A slot 30 is provided between any adjacent two of the teeth 28. Each slot 30 is a space through which the stator coil 24 is inserted.

The inner rotor-type rotary electric machine in which the rotor 12 is arranged inside the stator 14 is described here as an example. The technique according to the aspect of the disclosure may be applied to a rotary electric machine of another type as long as the rotor 12 and the stator 14 are arranged concentrically with each other. Therefore, the technique according to the aspect of the disclosure may be applied to, for example, an outer rotor-type rotary electric machine, a dual rotor-type rotary electric machine, or the like. In the outer rotor-type rotary electric machine, the rotor 12 is arranged concentrically with the stator 14 on the outer side of the stator 14. In the dual rotor-type rotary electric machine, the rotor 12 is arranged on each of the outer side and inner side of the stator 14. In the case of the outer rotor-type rotary electric machine, the teeth 28 protrude radially outward from the outer periphery of the yoke 26. In the case of the dual rotor-type rotary electric machine, the stator 14 includes teeth that protrude radially inward from the inner periphery of the yoke 26 and teeth that protrude radially outward from the outer periphery of the yoke 26.

The stator coil 24 includes a U-phase coil, a V-phase coil and a W-phase coil (hereinafter, referred to as phase coils when U, V, W phases are not distinguished from one another). The proximal end of each phase coil is connected to an input terminal, and the distal end of each phase coil is connected to the distal ends of the other phase coils to form a neutral point. Therefore, the stator coil 24 is provided by star connection. However, the mode of connection of the stator coil 24 may be changed as needed in response to a required motor characteristic, or the like. The stator coil 24 may be provided by, for example, delta connection instead of star connection.

Figure 4:
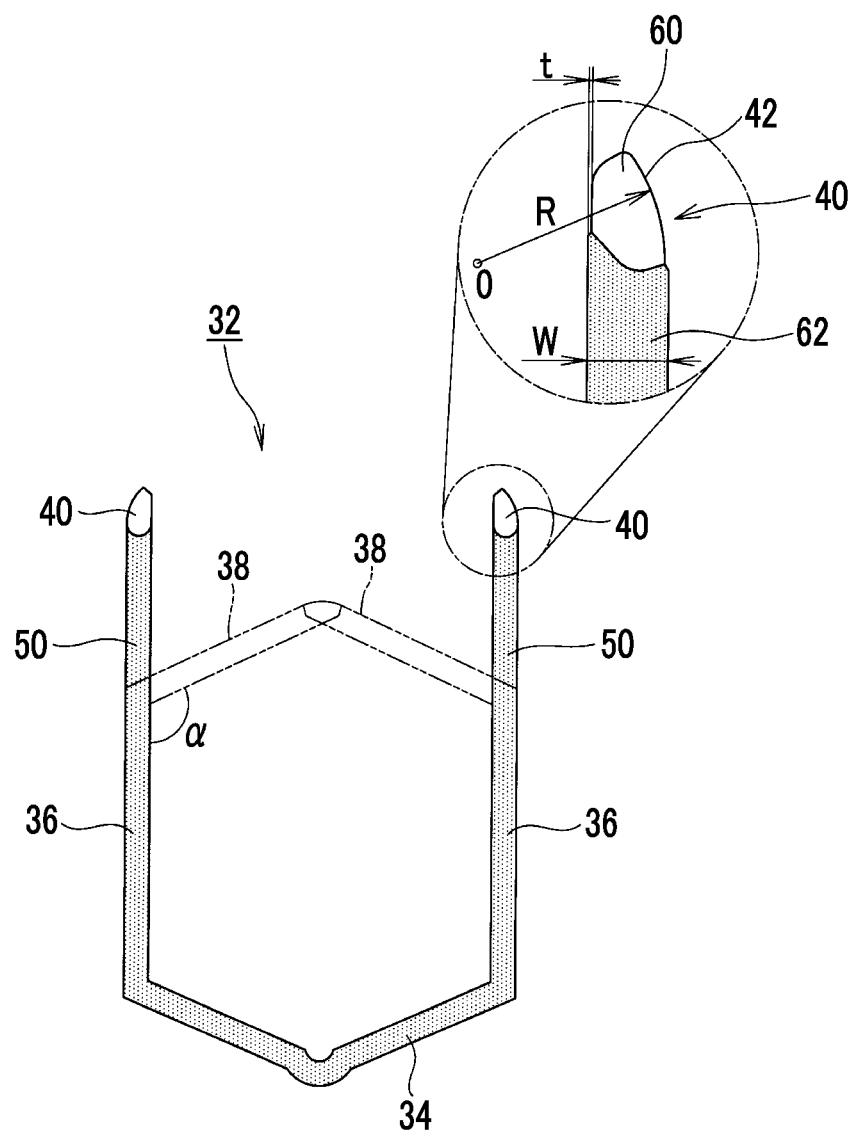
FIG. 4 is a schematic front view of a coil piece before the coil piece is assembled to the stator.

Each phase coil is formed by joining a plurality of the coil pieces 32. FIG. 4 is a schematic front view of a typical coil piece 32. The coil piece 32 is split from each phase coil in easy-to-assemble unit. The coil piece 32 is formed by coating a linear conductor 60 with an insulation film 62. The linear conductor 60 has a substantially rectangular cross section. In the stage before the coil piece 32 is assembled to the stator core 22, the coil piece 32 is formed in a substantially U shape. The coil piece 32 has a pair of straight portions 50 and a connecting portion 34 that connects the pair of straight portions 50. In assembling the coil piece 32 to the stator core 22, the pair of straight portions 50 are respectively inserted into the slots 30. Thus, the connecting portion 34 extends in the circumferential direction so as to stride across a plurality of the teeth 28 on the other end side of the stator core 22 in the axial direction. After the straight portions 50 are inserted into the slots 30, each straight portion 50 is bent in the circumferential direction at a midpoint as indicated by the alternate long and two-short dashed line in FIG. 4. Thus, each straight portion 50 is formed into a leg portion 36 and a linking portion 38. The leg portion 36 extends in the axial direction inside the slot 30. The linking portion 38 extends in the circumferential direction on one end side of the stator core 22 in the axial direction.

FIG. 4 illustrates the lap winding coil piece 32. The pair of straight portions 50 are bent in a direction to approach each other. However, the technique according to the aspect of the disclosure may be applied to a coil piece 32 of another winding mode, such as a wave winding coil piece 32. In the case of the wave winding coil piece 32, the pair of straight portions 50 are bent in a direction away from each other. The stator coil 24 can include not only the coil pieces 32 that constitute an annular coil wound around the teeth in an annular shape but also a coupling coil piece for coupling different annular coils with one another, a neutral point coil piece for forming a neutral point by coupling the terminal ends of the three phase coils with one another, or the like. The shape of each distal end portion 40 (described later) may be applied to these coupling coil piece and neutral point coil piece.

A plurality of the leg portions 36 of the coil pieces 32 shown in FIG. 4 are arranged in one slot 30 in the radial direction. A plurality of the linking portions 38 extending in the circumferential direction are arranged in the radial direction on one end side of the stator core 22 in the axial direction. As shown in FIG. 3, the linking portion 38 that exits from one of the slots 30 and extends in a first direction (for example, clockwise direction) in the circumferential direction is joined with the linking portion 38 that exits from another one of the slots 30 and extends in a second direction (for example, counter-clockwise direction) in the circumferential direction.

As described above, each coil piece 32 is coated with the insulation film 62, but the insulation film 62 is removed from only the distal end portions 40. This is to ensure electrical connection with another one of the coil pieces 32. As shown in FIG. 3 and FIG. 4, finally, an axially outer end face 42 at the distal end portion 40 of each coil piece 32, that is, one end face of each coil piece 32 in the width direction, is a circular arc face that is convex toward the outer side in the axial direction. The reason why the axially outer end face 42 of each distal end portion 40 is a circular arc face in this way will be described as compared to the existing art.

Figure 11:
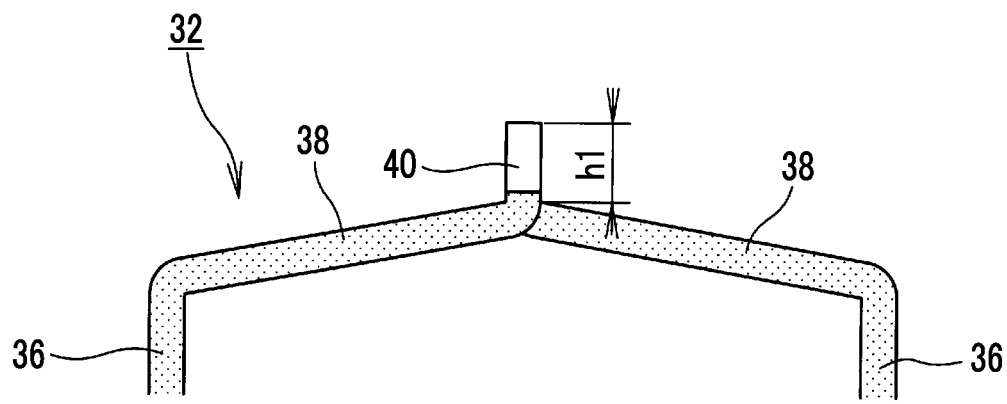
FIG. 11 is a view that shows an example of an existing coil piece.

In the existing rotary electric machine 10, as shown in FIG. 11, each linking portion 38 extends in the circumferential direction and then extends straight in an outer direction parallel to the axial direction. In this case, the coil end height is higher by a distance h1 by which the linking portion 38 extends toward the outer side in the axial direction. This leads to an increase in the size of the rotary electric machine 10. Such an increase in size is a major problem in a rotary electric machine for which installation space is limited, such as a rotary electric machine that is mounted on an electric vehicle as a drive motor. An extra coil material is required for the distance h1 by which the linking portion 38 extends toward the outer side in the axial direction. This leads to an increase in cost.

Figure 12:
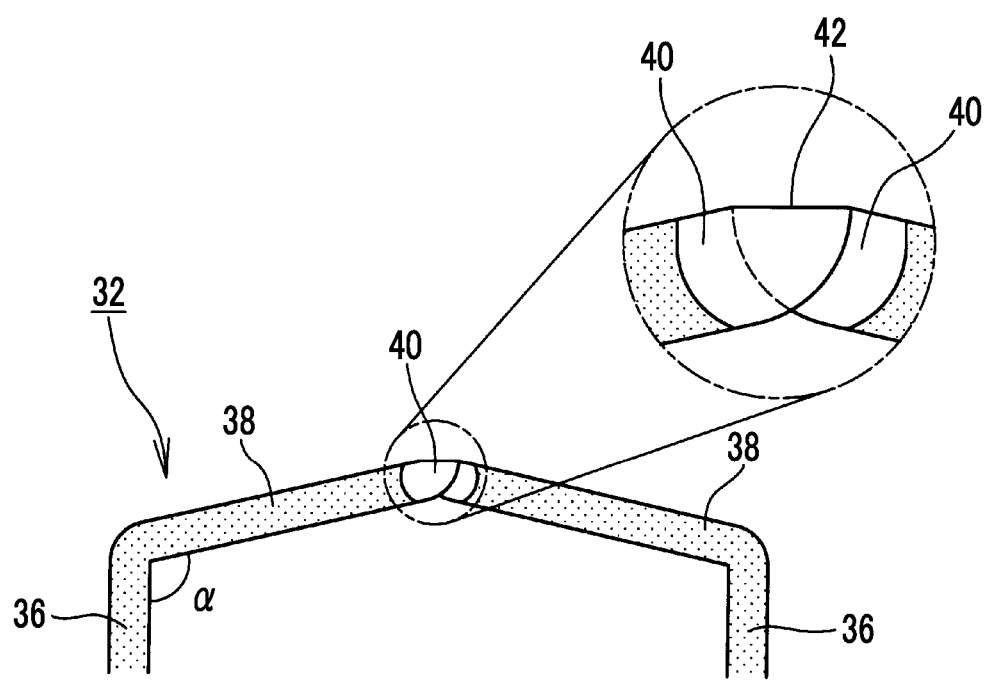
FIG. 12 is a view that shows another example of an existing coil piece.

Therefore, in order to lower the coil end height and reduce the coil material, there has been partly suggested that, as shown in FIG. 12, the linking portions 38 are joined while remaining extended in the circumferential direction without being bent in a direction parallel to the axial direction. With this technique, it is possible to lower the coil end height by the distance h1 by which the linking portions 38 extend toward the outer side in the axial direction.

Figure 13:
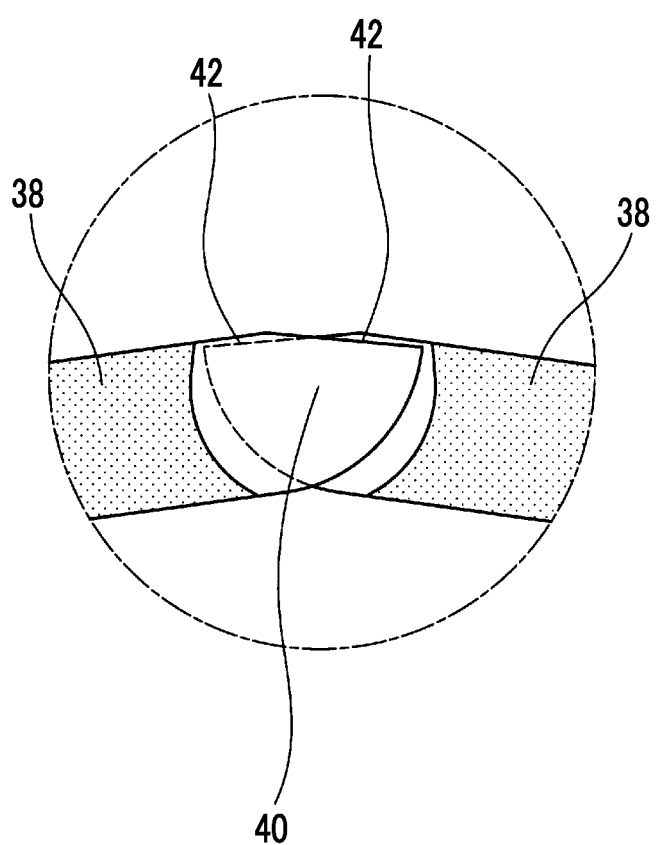
FIG. 13 is a view that shows a state where a bending angle has varied in the coil piece shown in FIG. 12.

However, in the existing technique, the axially outer end face 42 of each distal end portion 40 is a flat face. In this case, if the bending angle α that the linking portion 38 forms with the leg portion 36 varies, part of the distal end portion 40 extends off from the distal end portion 40 to be joined, as shown in FIG. 13. In order to avoid such a protrusion, it has been required to change the shape of the distal end portion 40 for each bending angle α. Changing the shape of the distal end portion 40 in response to the bending angle α in this way leads to an increase in time and effort for manufacturing and an increase in cost for manufacturing.

Particularly, when the coil end height is intended to be minimized, the bending angle α of the coil piece 32 located on the outer side in the radial direction becomes smaller, so the number of types of the shape of the distal end portion 40 also increases. That is, in order to minimize the coil end height, it is required to align all the axial heights of the distal end portions 40 of the plurality of coil pieces 32 arranged in the radial direction to the minimum height (same height). On the other hand, a slot-to-slot distance becomes longer toward the outer side in the radial direction, so the length of the linking portion 38 of the coil piece 32 located on the outer side in the radial direction becomes larger. As a result, when the coil end height is intended to be minimized (when the heights of the distal end portions 40 in the axial direction are aligned to the same height), the bending angle α of the coil piece 32 located on the outer side in the radial direction becomes smaller.

Therefore, when the coil end height is minimized while the axially outer end face 42 of each distal end portion 40 is a flat face, since the bending angle α varies depending on the position of the coil piece 32 in the radial direction, coil pieces 32 of multiple types with the distal end portions 40 having different shapes need to be prepared. Manufacturing coil pieces 32 of multiple types not only takes time and effort but also leads to an increase in cost resulting from, for example, an increase in the type of cutter.

In the technique according to the aspect of the disclosure, the axially outer end faces 42 of the distal end portions 40 of each coil piece 32 are circular arc faces that are convex toward the outer side in the axial direction. With this configuration, even when the bending angle α varies, two distal end portions 40 to be joined are appropriately put on top of each other. This will be described with reference to FIG. 5 and FIG. 6.

Figure 5:
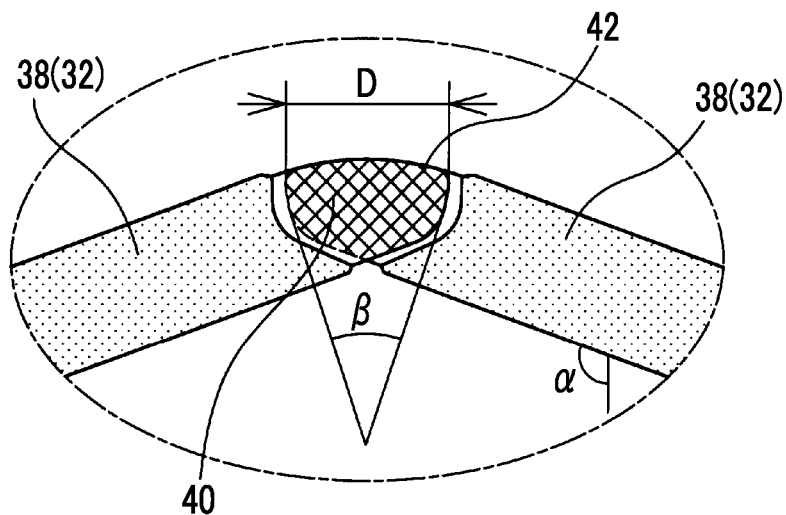
FIG. 5 is a view that shows a portion close to distal end portions of coil pieces joined with each other.
Figure 6:
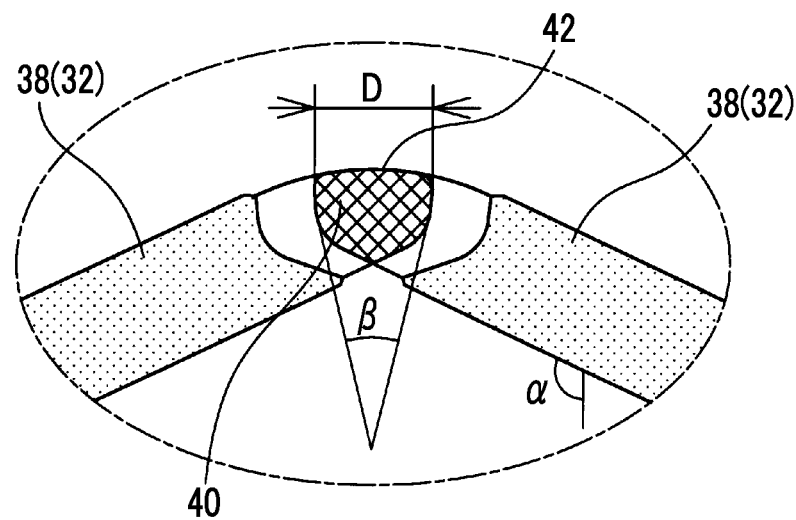
FIG. 6 is a view that shows a portion close to distal end portions of coil pieces joined with each other.

FIG. 5 and FIG. 6 are views that show a portion close to the distal end portions 40 of the coil pieces 32 joined with each other. The example shown in FIG. 5 is smaller in the bending angle α than the example shown in FIG. 6. In FIG. 5 and FIG. 6, cross-hatched portions show lap portions at which the two distal end portions 40 lap each other.

In joining the distal end portions 40 of the coil pieces 32, the two distal end portions 40 to be joined with each other are put on top of each other in their thickness direction and joined with each other such that the central axes O of the circular arc faces (axially outer end faces 42) of the distal end portions 40 coincide with each other. By putting the distal end portions 40 on top of each other while the central axes are aligned with each other in this way, the axially outer side lines of the two distal end portions 40 to be joined with each other coincide with each other even in the case where the bending angle α is large (in the case of FIG. 6) and in the case where the bending angle α is small (in the case of FIG. 5). Therefore, the distal end portions 40 are appropriately put on top of each other. As a result, even when the distal end portions 40 of the plurality of coil pieces 32 have the same shape, it is possible to align the axial heights of the plurality of coil pieces 32 arranged in the radial direction to the same height.

Incidentally, in the technique according to the aspect of the disclosure, the radius R of the circular arc face (axially outer end face 42) is set to a larger value, specifically, a value larger than or equal to the width W of the coil piece 32 (see FIG. 4).

This is to ensure a sufficient joint area. That is, in order to ensure a sufficient joint area, the length of a lap portion at which the two distal end portions 40 to be joined lap each other, that is, a lap distance D, just needs to be increased. The lap distance D is expressed by $D=2 \cdot R \cdot \tan(\beta/2)$ where the center angle of the lap portion is β. Since the center angle β becomes larger as the bending angle α becomes smaller, the lap distance D becomes larger as the radius R becomes larger or the center angle β becomes larger (the bending angle α becomes smaller).

However, if the lap distance D is excessively large, there is a possibility that an insulation distance from another coil piece 32 adjacent in the circumferential direction is not ensured. This will be described with reference to FIG. 7. As described above, each coil piece 32 has an insulating portion coated with the insulation film 62 and the distal end portions 40 from which the insulation films 62 are removed. The insulation distance that should be considered in each coil piece 32 includes a first insulation distance C1, a second insulation distance C2 and a third insulation distance C3. The first insulation distance C1 is required between the insulation portions. The second insulation distance C2 is required between the insulation portion and the distal end portion 40. The third insulation distance C3 is required between the distal end portions 40. Of course, C3>C2>C1.

Figure 7:
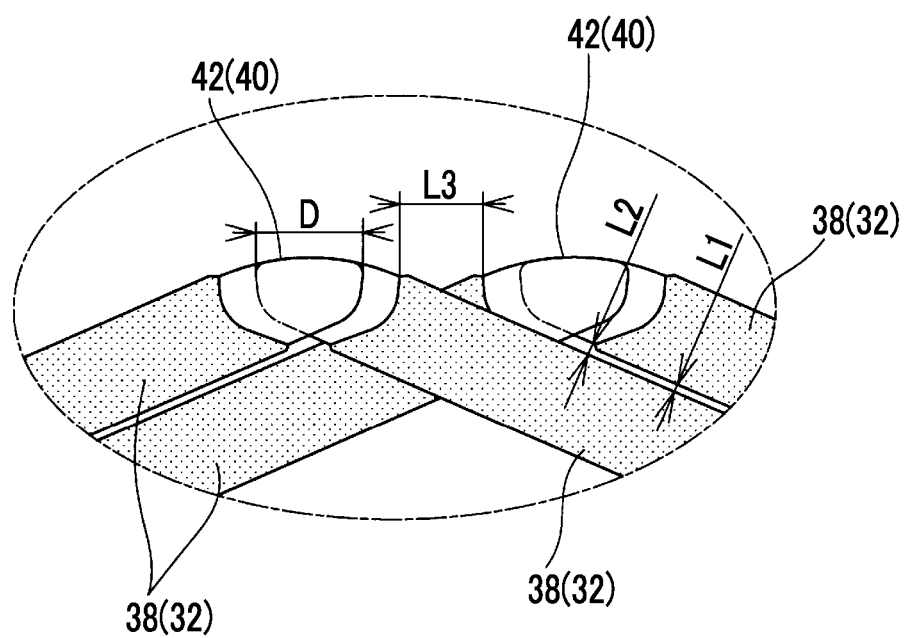
FIG. 7 is a view that illustrates an insulation distance between coil pieces.

In the state shown in FIG. 7, a distance L1 between the coated portions of the coil pieces 32 adjacent in the axial direction should be larger than or equal to the first insulation distance C1. Depending on the thickness and material of the insulation film 62, generally, C1≈0, and it is no problem if the insulation portions contact each other. Therefore, it is no problem if the distance L1 is 0, and it is not required to pay special attention to the distance L1.

A distance L2 between the insulation portion and distal end portion 40 of the coil pieces 32 adjacent in the axial direction should be larger than or equal to the second insulation distance C2. In each coil piece 32 according to the aspect of the disclosure, the thickness t (see FIG. 4) of the insulation film 62 is larger than or equal to the second insulation distance C2. With this configuration, even when the arrangement, bending angle α, or the like, of each coil piece 32 is not especially devised, the distance L2 between the insulation portion and the distal end portion 40 is allowed to be set so as to be larger than or equal to the second insulation distance C2.

A distance L3 between the distal end portions 40 adjacent in the circumferential direction should be larger than or equal to the third insulation distance C3. If the radius R is increased to increase the length of each distal end portion 40 in order to ensure the lap distance D, the distance L3 reduces, so there is a possibility that a sufficient insulation distance is not ensured. Particularly, on the inner side in the radial direction where the bending angle α is relatively large, the lap distance D reduces, and the distance L3 in the circumferential direction between the distal end portions 40 adjacent in the circumferential direction also reduces. That is, both the lap distance D and the third insulation distance C3 are more difficult to be ensured on the inner side in the radial direction. Therefore, in determining the length, radius R, and the like, of each distal end portion 40, it is desired to determine the length, radius R, and the like, of each distal end portion 40 with reference to the coil piece 32 located on the innermost side in the radial direction.

Figure 8:
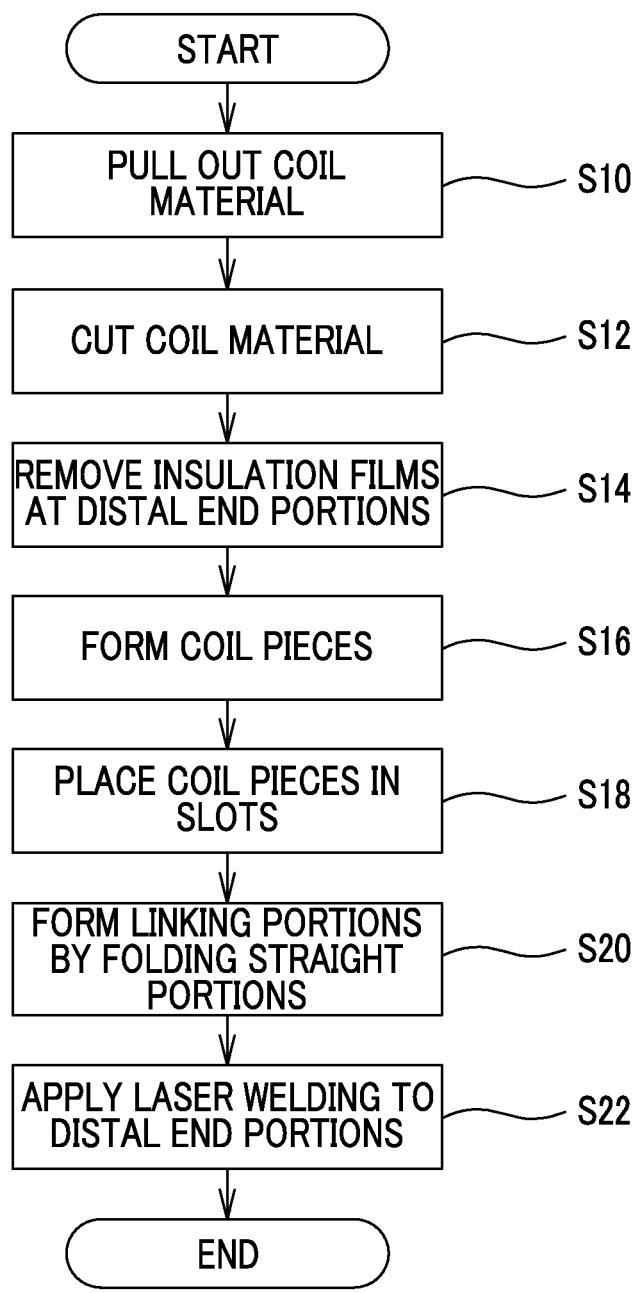
FIG. 8 is a flowchart that illustrates the flow of manufacturing a stator coil.

Next, the flow of manufacturing the thus configured stator coil 24 will be described with reference to FIG. 8. FIG. 8 is a flowchart that shows the flow of manufacturing the stator coil 24. When the stator coil 24 is manufactured, initially, the coil pieces 32 that constitute the stator coil 24 are manufactured. Each coil piece 32 is manufactured by cutting and forming a long flat wire coil material into a shape. The coil material is ordinarily stored in a state where the coil material is wound around a bobbin in a rolled shape. Therefore, at the time of manufacturing the coil pieces 32, initially, the coil material is pulled out from the bobbin (S10). At this time, since the pulled-out coil material has a core set, the coil material is straightened with a plurality of straightening rollers, or the like.

Figure 9:
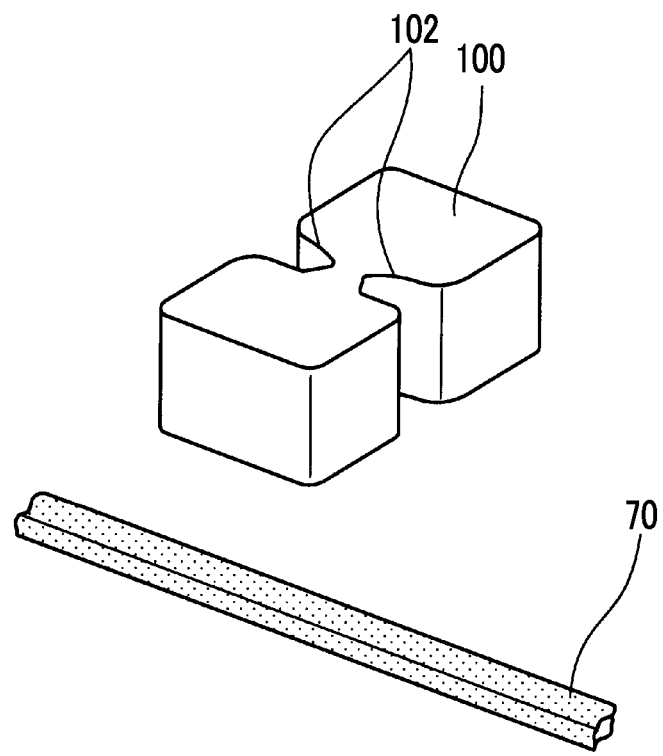
FIG. 9 is a view that shows a state where a coil material is cut.
Figure 10:
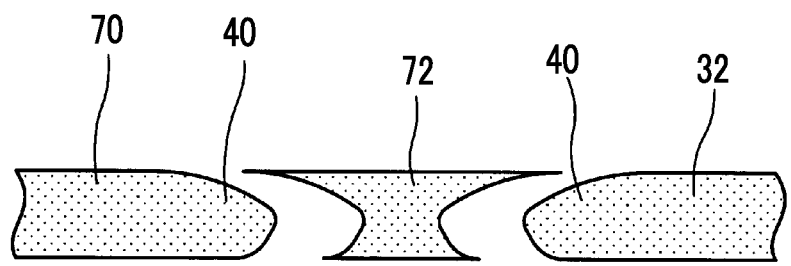
FIG. 10 is a view that shows a state where a coil material is cut.

When the coil material is straightened, the coil material is subsequently cut into a desired length (S12). FIG. 9 and FIG. 10 are conceptual views that show a state of the cutting step. The coil material 70 is cut with a cutting tool 100. The cutting tool 100 has two cutters 102 arranged in a mirror image relation. The cutters 102 respectively have shapes corresponding to the shapes of the distal end portions 40. By pressing the cutting tool 100 against the coil material 70, the terminal end of one coil piece 32 and the start end of another coil piece 32 are formed at the same time. As described above, when one end face (axially outer end face 42) of each distal end portion 40 is a circular arc face, it is not required to change the shape of the distal end portion 40 for each coil piece 32. Therefore, the shape of each cutter 102 to be prepared just needs to be one type, so it is possible to reduce time and effort and cost that are taken for cutting. In FIG. 10, the reference numeral 72 denotes a cut residue.

When the coil pieces 32 before forming are obtained by cutting the coil material into a predetermined length, the insulation films 62 of the distal end portions 40 (start end and terminal end) of each coil piece 32 are subsequently removed (S14). Various methods of removing the insulation films 62 are conceivable. For example, the insulation films 62 may be mechanically removed with a cutter or may be chemically removed by etching, or the like. Alternatively, the insulation films 62 may be thermally removed with a laser. More specifically, the insulation films 62 of the distal end portions 40 may be removed by irradiating laser light of a predetermined level to two faces, that is, the front face and rear face, of each distal end portion 40.

In order to join the coil pieces 32 with each other, at least only the insulation film 62 of a face (one of the front face and the rear face) that is actually joined in the distal end portion 40 just needs to be removed, and the insulation films 62 of the other faces (the other one of the rear face and the front face, and the side face) may be left. However, realistically, since these other faces degrade by heat, or the like, that is generated in a welding process (described later) into dust if they are left, these other faces are desirably removed in this stage.

When the insulation films 62 are removed, each of the straight coil pieces 32 is subsequently bent with a die, or the like, and is formed (S16). For example, as shown in FIG. 4, each coil piece 32 is formed into a substantially U shape, and includes the pair of straight portions 50 and the connecting portion 34 that connects the pair of straight portions 50 with each other.

Subsequently, when the coil pieces 32 are formed, the coil pieces 32 are inserted into the slots 30 of the stator core 22 (S18). When all the coil pieces 32 are inserted, a portion of each straight portion 50, protruding from the corresponding slot 30, is folded in the circumferential direction with an exclusive jig (S20). Thus, each straight portion 50 is formed into the leg portion 36 extending in the axial direction inside the slot 30 and the linking portion 38 extending in the circumferential direction on one end side in the axial direction.

When the linking portions 38 are formed, the distal end portion 40 of one of the linking portions 38 extending in the first direction (for example, clockwise direction) in the circumferential direction and the distal end portion 40 of another one of the linking portions 38 extending in the second direction (for example, counter-clockwise direction) in the circumferential direction are subsequently joined with each other (S22). In joining, the two distal end portions 40 to be joined with each other are put on top of each other in the thickness direction. At this time, the central axes O of the axially outer end faces 42 of the two distal end portions 40 are brought into coincidence with each other. Thus, the axially outer side lines of the two distal end portions 40 coincide with each other, so the two distal end portions 40 are allowed to be appropriately put on top of each other.

The two distal end portions 40 are joined with each other by welding. A welding method may be arc welding, typically, TIG welding, or may be laser welding that uses laser light as a heat source. In the case of laser welding, as shown in FIG. 3, laser light 110 for welding is irradiated to a portion close to the joint faces of the two distal end portions 40 put on top of each other. Laser welding is able to heat a local portion, so it is possible to heat only a portion closer to the distal end portions 40, with the result that it is possible to effectively prevent thermal degradation, or the like, of the insulation films 62. As a result, the plurality of coil pieces 32 are electrically connected with each other while appropriate insulation performance is maintained. When all the coil pieces 32 have been welded, the stator coil 24 is completed.

The manufacturing process for the coil pieces 32, described here, is just one example, and may be modified as needed. For example, the sequence of cutting the coil material and removing the insulation films 62 may be reversed, and the sequence of removing the insulation films 62 and forming the coil pieces 32 may also be reversed. In any case, when the axially outer end face 42 of each distal end portion 40 is a circular arc face, it is possible to reduce the number of types of the shape of the distal end portion 40, so it is possible to reduce time and effort for manufacturing and cost for manufacturing.

As is apparent from the above description, in the case of the rotary electric machine 10 according to the embodiment of the disclosure, the distal end portions 40 of each coil piece 32 each have a circular arc face. For this reason, even when the bending angle α varies depending on a difference in radial position at which the coil piece 32 is arranged, it is not required to change the shapes of the distal end portions 40.

As a result, it is not required to prepare many types of cutters that are used to manufacture the coil pieces 32, so it is possible to reduce time and effort for manufacturing and cost for manufacturing. Even when the bending angle α varies, it is not required to change the shapes of the distal end portions 40, so it is possible to align the heights of the distal end portions 40 of the plurality of coil pieces 32 to a lower height, with the result that it is possible to reduce the coil end height. As long as the axially outer end face 42 of each distal end portion 40 is a circular arc face, the other configuration may be modified as needed. For example, in the above-described example, all the distal end portions 40 of the plurality of coil pieces 32 have the same shape. Instead, the distal end shape of each of part of the coil pieces 32 may vary. For example, the axially outer end faces 42 of half of the coil pieces 32, located on the inner side in the radial direction, each may have a circular arc face having a radius R1, and the axially outer end faces 42 of the other half of the coil pieces 32, located on the outer side in the radial direction, each may have a circular arc face having a radius R2. In this case as well, in comparison with the case of FIG. 12 in which each axially outer end face 42 is a flat face, it is possible to significantly reduce the types of the shape of each distal end portion 40, so it is possible to reduce time and effort for manufacturing and cost for manufacturing.

What is claimed is:

1. A rotary electric machine comprising:
    a rotor; and
    a stator including
        a stator core arranged concentrically with the rotor, and
        a stator coil wound on the stator core, wherein
    the stator coil includes a plurality of flat wire-shaped coil pieces extending in a circumferential direction of the electric rotary machine at a position on an outer side of the stator core in an axial direction of the rotary electric machine,
    at the position on the outer side of the stator core in the axial direction, a distal end portion of one of the coil pieces, extending in a first direction in the circumferential direction, is joined with a distal end portion of another one of the coil pieces, extending in a second direction in the circumferential direction, the second direction in the circumferential direction is reverse to the first direction in the circumferential direction, and
    an axially outer end face of the distal end portion of each coil piece is a circular arc face that is convex toward the outer side in the axial direction, wherein
    the one of the coil pieces and the another one of the coil pieces overlap with each other in a thickness direction of the coil pieces such that a central axis of the circular arc face of the one of the coil pieces coincides with a central axis of the another one of the coil pieces.

2. The rotary electric machine according to claim 1, wherein
    a radius of the circular arc face of each coil piece is larger than a width of the coil piece.

3. The rotary electric machine according to claim 1, wherein
    each coil piece has a leg portion and a linking portion, the leg portion extends in the axial direction inside a slot formed in the stator core, the linking portion extends in the circumferential direction at the position on the outer side of the stator core in the axial direction, and the leg portion forms a bending angle with the linking portion,
    the stator coil includes two or more of the coil pieces arranged in a radial direction of the rotary electric machine, and among the two or more coil pieces, the coil piece arranged on an outer side in the radial direction has a smaller bending angle such that a height of the distal end portion of the two or more coil pieces in the axial direction is the same.

4. The rotary electric machine according to claim 1, wherein
all the distal end portions of the plurality of coil pieces have the same shape.

5. The rotary electric machine according to claim 1, wherein
an entire part of each coil piece except the distal end portion is coated with an insulation film, and
a thickness of the insulation film is larger than or equal to an insulation distance that is required between a coil piece not coated with the insulation film and a coil piece coated with the insulation film.

* * * * *